United States Patent [19]

Umino

[11] Patent Number: 4,698,705
[45] Date of Patent: Oct. 6, 1987

[54] TAPE DOUBLE-CASSETTE RECORDER

[75] Inventor: Kunio Umino, Yamanashi, Japan

[73] Assignees: Kabushiki Kaisha Sankyo Seiki Seisakusho, Nagano; Tokyo Pigeon Co., Ltd., Tokyo, both of Japan

[21] Appl. No.: 776,341

[22] Filed: Sep. 16, 1985

[51] Int. Cl.⁴ .............................................. G11B 15/68
[52] U.S. Cl. ....................................... 360/92; 360/105
[58] Field of Search ............................ 360/92, 94, 105

[56] References Cited

U.S. PATENT DOCUMENTS 3,809,827 5/1974 Oyaba ................................. 360/92 X

FOREIGN PATENT DOCUMENTS 2802255 8/1978 Fed. Rep. of Germany ........ 360/92

Primary Examiner—A. J. Heinz
Attorney, Agent, or Firm—Sughrue, Mion, Zinn, Macpeak & Seas

[57] ABSTRACT

A double-cassette tape recorder in which a head base plate on which are mounted magnetic heads and a pinch roller is selectively moved with respect to stacked and stationary announcement and reproducing tape cassettes, whereby the space required for moving members for changing between the recording and the reproducing modes is reduced, and further a complex positioning mechanism can be omitted, resulting in a compact double-cassette tape recorder.

8 Claims, 12 Drawing Figures

TAPE DOUBLE-CASSETTE RECORDER

BACKGROUND OF THE INVENTION

The present invention relates to a double-cassette tape recorder of a type used in a telephone answering machine.

In a conventional double-cassette tape recorder for a telephone answering machine, there are provided an announcement tape used for reproducing upon a call being received a message previously recorded, and a recording tape used for recording messages of calling parties. Such double tapes are received in two respective cassettes, and the two cassettes are disposed side by side in the lateral direction. This type of double-cassette tape recorder, which is substantially equivalent to two separate tape recorders, has the drawback that a comparatively large space for mounting the two cassettes is required.

To eliminate such a drawback, there has been proposed a tape recorder in which an announcement tape cassette and a recording tape cassette are stacked in the vertical direction and reproduction (playing the announcement tape) and recording (of messages of calling parties) are selected by sliding in the vertical direction a single assembly of a magnetic head, a pinch roller, a capstan roller, etc. Such a tape recorder is disclosed in Japanese Unexamined Patent Application No. 57-24150.

However, in such a tape recorder of the stacked cassette type, it is necessary for effecting reproduction and recording to move the two stacked cassettes integrally, and hence considerable space is required for moving the stacked cassettes upwardly and downwardly. Thus, it is not possible to make the tape recorder sufficiently small.

SUMMARY OF THE INVENTION

Accordingly, it is an object of the present invention to provide a double-cassette tape recorder having a comparatively small size and a compact construction.

In accordance with this and other objects, the present invention provides such a tape recorder in which a reproducing tape cassette and a recording tape cassette are stacked in the vertical direction with the stacked cassettes being held in a predetermined position in the tape recorder, and a head base plate on which are mounted magnetic heads and a pinch roller is moved to selectively effect reproducing and recording.

DESCRIPTION OF THE PREFERRED EMBODIMENTS

Figure 1:
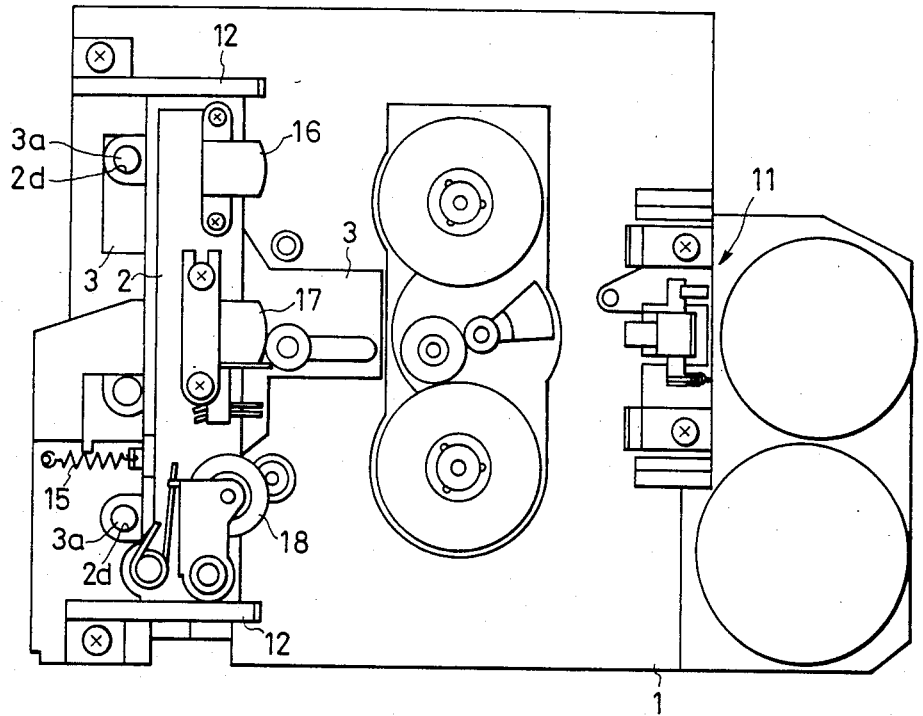
FIG. 1 is a plan view showing a preferred embodiment of a tape recorder of the present invention.

Referring to FIGS. 1 to 12, a preferred embodiment of a double-cassette tape recorder of the present invention will be explained in detail. Reference numerals used commonly in each figure designate like elements.

In FIGS. 1 to 5, there is provided a pair of guide walls 12 fixed on a chassis 1 and spaced apart from each other, each guide wall 12 having wishbone shaped guide slots 13 and 14 having substantially the same configuration. The guide slot 13 is composed of a base portion 13a extending in the horizontal direction, an upper portion 13b connected to the base portion 13a, and a lower portion 13c connected to the base portion 13a. The guide slot 14 is formed similarly to the guide slot 13.

There is provided above the chassis 1 a head base plate 2 movable in the back and forth and vertical directions by a mechanism described in the following.

Figure 3:
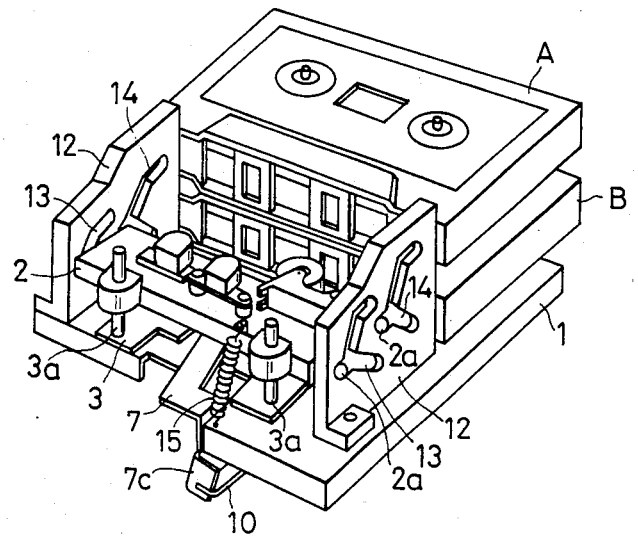
FIG. 3 is a perspective view of the tape recorder of FIG. 1.
Figure 4:
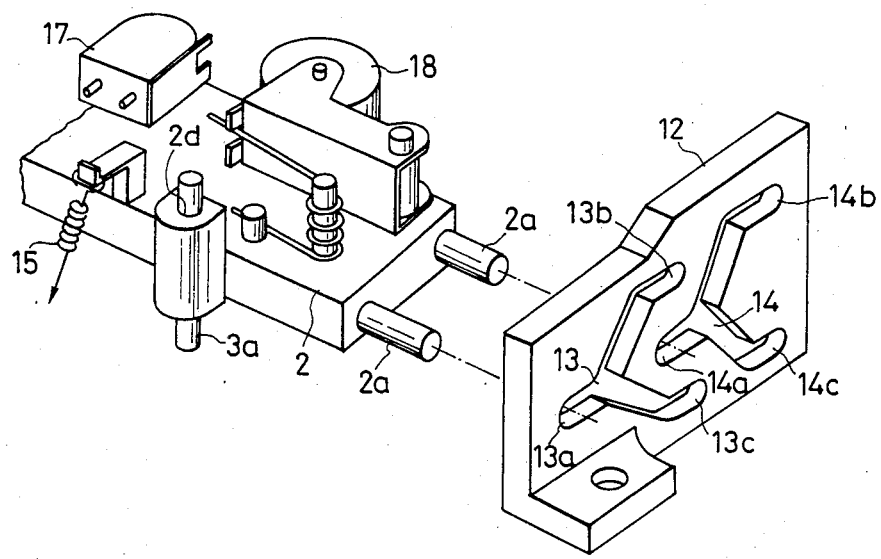
FIG. 4 is a perspective and exploded view of a head base plate and guiding slots.

As shown in FIG. 4, a pair of pins 2a is fixed on each of side surfaces of the head base plate 2, and two pins 2a are provided to be inserted into the guide slots 13 and 14 respectively. A spring 15, coupled between the chassis 1 and the head base plate 2, energizes the head base plate 2 towards a lower and front portion at the end of the base portion 13a. Therefore, the pins 2a are normally located at that position, as shown in FIG. 3. On the head base plate 2 there are disposed magnetic heads 16 and 17 and a pinch roller 18. A sliding plate 3 is provided which is movable from a front portion to a rear portion and vice versa utilizing a suitable guiding structure (not shown). There is fixed on the sliding plate 3 a pair of guide spindles 3a, as shown in FIGS. 1 and 5, and each guide spindle 3a is slidably inserted into a guide hole 2d of the member fixed on the front end surface of the head base plate 2, thereby guiding the head base plate 2 to move upwardly and downwardly.

Figure 5:
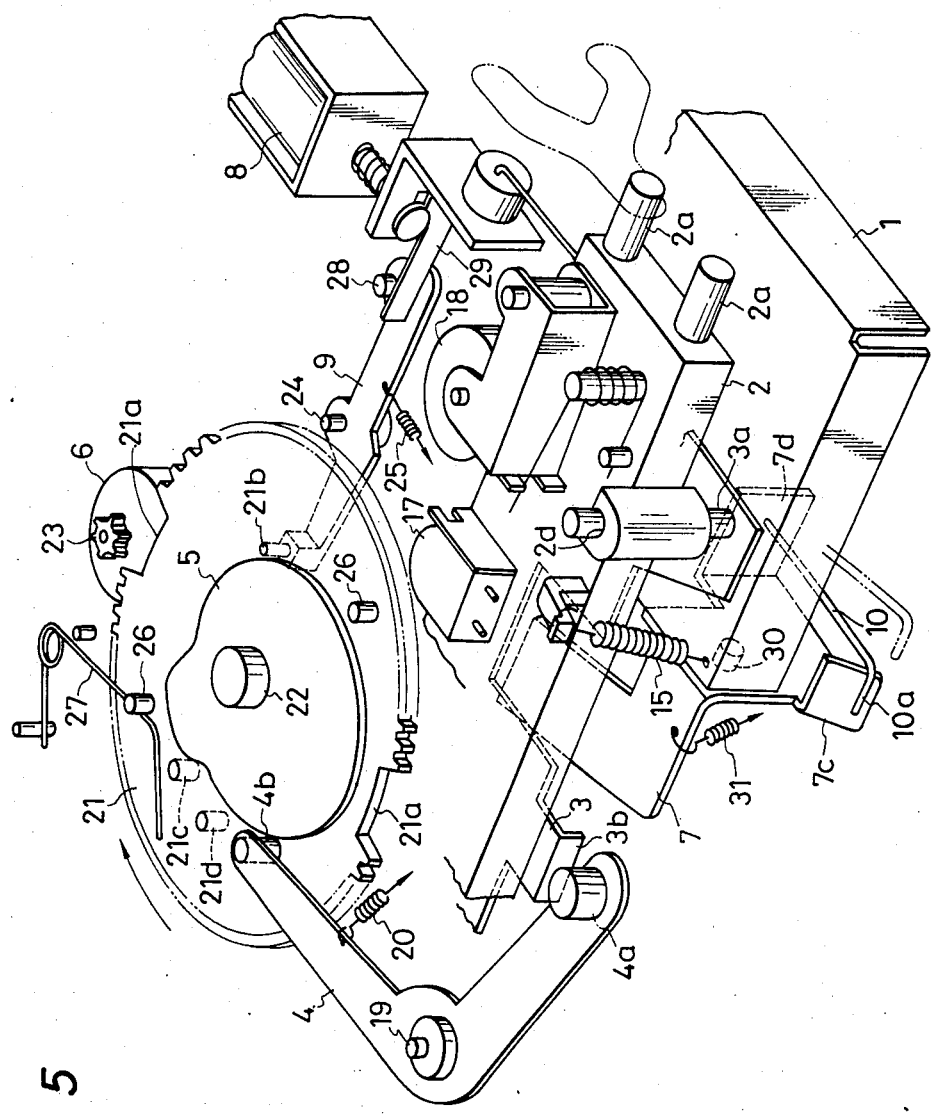
FIG. 5 is a perspective view of a main construction of the tape recorder of FIG. 2.

As shown in FIG. 5, a folded portion 3b is provided at the front end of the sliding plate 3, the folded portion 3b being adapted to contact with a pin 4a fixed on the end portion of one arm of a bell-crank like assist lever 4 rotatable around a shaft 19. On the end portion of another arm of the assist lever 4 there is provided a pin 4b which normally contacts the periphery of an assist cam 5 held thereagainst by the resilient force of a spring 20 mounted between another arm of the assist lever 4 and the chassis 1. Therefore, the assist lever 4 with the pin 4b is moved counterclockwise by the rotation of the assist cam 5 against the spring 20 so that the pin 4a pushes the folded portion 3b of the sliding plate 3, thereby moving the head base plate 2 as well as the sliding plate 3 rearward.

The assist cam 5 is fixed on a gear wheel 21, rotatable around a shaft 22. The gear wheel 21 is engageable with a pinion 23 of a driving source 6 such as an electric motor, but there is provided two recess portion 21a on the gear wheel 21 at which the engagement with the pinion 23 cannot be achieved. At the upper surface of the gear wheel 21, there are provided two pins 26. The positions of the recess portions 21a and the pins 26 are determined such that, when the recess portion 21a is opposite to the pinion 23, the pin 26 is urged to rotate clockwise (in FIG. 5) by the resilient force of a spring 27, thereby achieving engagement between the gear wheel 21 and the pinion 23. On the other hand, a pin 21b, fixed on the lower surface of the gear wheel 21, is adapted to contact with one end of a control lever 9 rotatable around a shaft 24, the control lever 9 being energized clockwise in FIG. 5 by a spring 25. Pins 21c and 21d are also fixed on the lower surface of the gear wheel 21, which pins 21c and 21d are located on the opposite side of the pin 21b with respect to the shaft 22. The space between the pins 21c and 21d is set to allow insertion of the end of the control lever 9 thereinto. The relationship in position between the pins 21c and 21d and the recess portion 21a is such that when the end of the control lever 9 contacts the pin 21c or 21d, the recess portion 21a is located opposite the pinion 23 by the resilient force of the spring 27.

At another end of the control lever 9, a pin 28 is fixed, which pin 28 is adapted to contact with a controlling member 29 controlled by a solenoid 8 to move between front and rear side positions. In the normal state (deenergized) of the solenoid 8, the end of the control lever 9 is rotated clockwise (in FIG. 5) by the spring 25, thereby locating the end of the control lever 9 on the rotating path of the pins 21b, 21c and 21d, and therefor the rotation of the gear wheel 21 is inhibited against the resilient force of the spring 27. On the other hand, in the case of energization of the solenoid 8, the controlling member 29 is attracted to rotate the control lever 9 counterclockwise in FIG. 5 against the spring 25, thereby locating the end of the control lever 9 outside the rotating path of the pins. Therefore, engagement between the gear wheel 21 and the pinion 23 is achieved by the resilient force of the spring 27.

Figure 6:
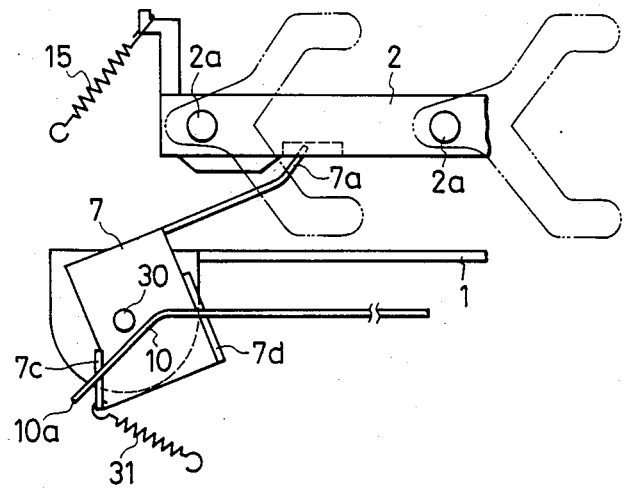
FIG. 6 is a side view of the head base plate being guided downwardly by guiding slots.
Figure 7:
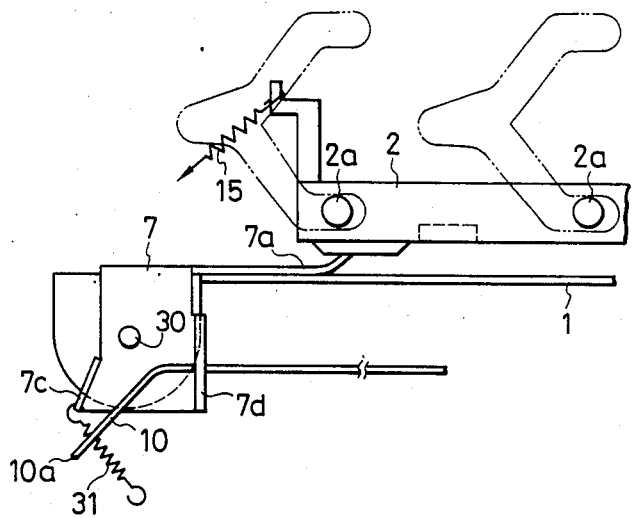
FIG. 7 is a side view of the head base plate in its normally maintained position.
Figure 8:
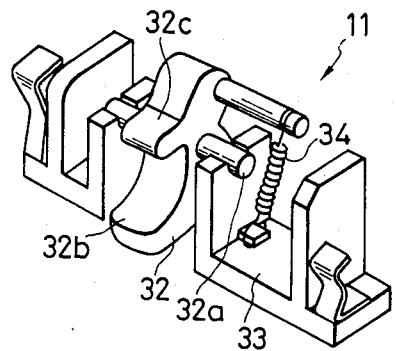
FIG. 8 is a perspective view of a cassette holding mechanism.

Referring to FIGS. 5 to 7, a guide plate 7 is connected rotatably to a front portion of the chassis 1 around the shaft 30. The end 7a of one arm of the guide plate 7 is positioned under the head base plate 2. The guide plate 7 is normally energized to be rotated counterclockwise by a spring 31 shown in FIG. 6, namely, the head base plate 2 is pushed upwardly by the end 7a. However, the force pushing the head base plate 2 upwardly due to the spring 31 is made smaller than a force pulling the head base plate 2 downwardly due to the spring 15; therefore, the head base plate 2 is normally maintained in the position shown in FIG. 7. The guide plate 7 also has a folded portion 7d and a folded and inclined portion 7c. A guide rod 10, connected to the controlling member 29 and passing through the folded portion 7d and the bent portion 10a of the guide rod 10, is contactable with the folded and inclined portion 7c.

For the normal position of the head base plate 2 as shown in FIG. 6, the folded portion 7d of the guide plate 7 is rotated by the resilient force of the spring 31, and therefore the guide rod 10 is brought up by the folded portion 7d, thereby positioning the bent portion 10a opposite to the folded and inclined portion 7c. On the other hand, in the case where the head base plate 2 is depressed at the lower position as shown in FIG. 7, the guide plate 7 is rotated by the head base plate 2, clockwise in FIG. 7, against the spring 31, and the guide rod 10 is depressed by the folded portion 7d, thereby moving the bent portion 10a under the folded portion 7c.

The solenoid 8 is controlled by a control circuit (not shown), and actuated to change operational modes as mentioned hereinafter.

Figure 2:
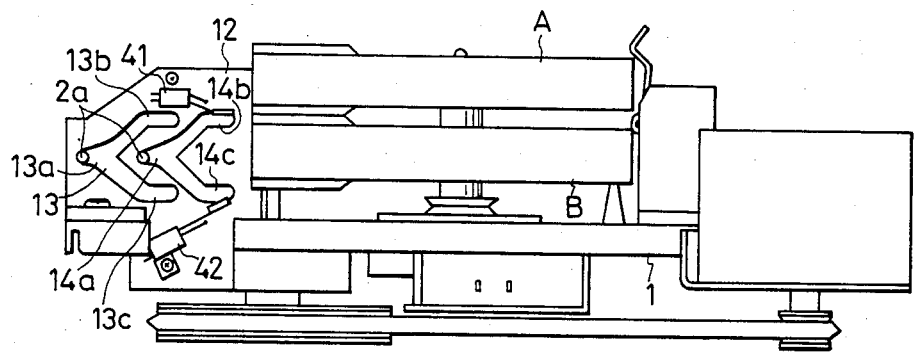
FIG. 2 is a side view of the tape recorder of FIG. 1.

Referring to FIGS. 2 and 3, A and B indicate, respectively, a recording tape cassette for recording messages left by calling parties and an announcement tape cassette for transmitting a message previously recorded to calling parties. The recording tape cassette A is put in (stacked) after the announcement tape cassette B has been placed on the chassis 1. Since a cassette is generally formed with thick and thin portions, it is not possible to set the two cassettes at a predetermined and correct position only by stacking the cassette A on the cassette B.

Figure 9:
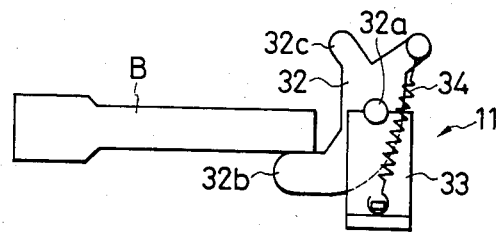
FIGS. 9 to 12 are side views of a cassette holding mechanism in various positions.
Figure 10:
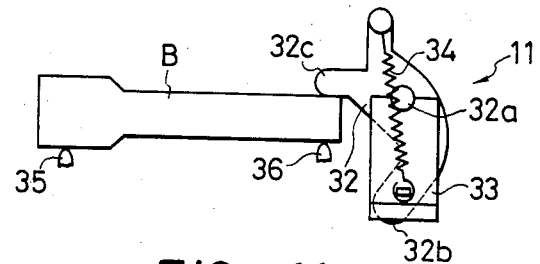
Figure 11:
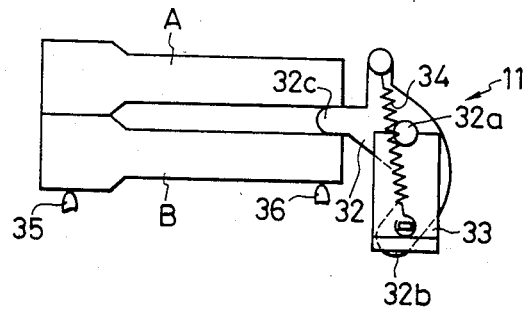
Figure 12:
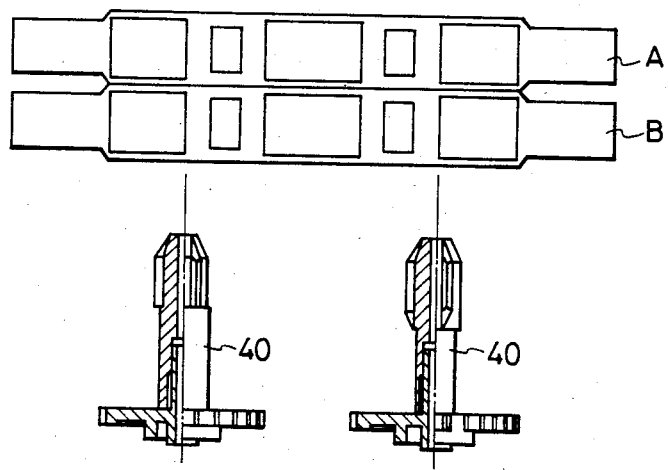

Referring to FIGS. 1 and 8 to 12, a holding mechanism for holding the stacked cassettes at a predetermined correct position will be explained in detail. The holding mechanism 11 is composed of a cassette receiving member 32, a supporting member 33 for supporting the receiving member 32 and a click spring 34. The holding mechanism 11 is disposed at the rearmost portion of the chassis 1, as shown in FIG. 1. The cassette receiving member 32 has a shaft 32a rotatably supported by the supporting member 33. The cassette receiving member 32 has a receiving arm 32b for receiving the lower surface of the announcement tape cassette B when the cassette B is positioned as shown in FIG. 9 and a depressing arm 32c interposed between two cassettes A and B for depressing the cassette B and providing a suitable space between two cassettes A and B, as shown in FIGS. 10, 11 and 12, when they are received on spindles 40 (FIG. 12). Incidentally, the recording tape cassette A is of the regular type available on the market whereas the announcement tape cassette B is of the endless type. During the playback of the cassette B, the tape is fed only by the cooperation of the pinch roller 18 and the capstan shaft. Thus, the lower portions of spindles 18 are not provided with ribs for engagement with the reel holes of the cassette. The recording cassette A is fed in a well known manner.

In the operation of the holding mechanism, if no cassette is inserted, the receiving member 32 is in the position where the receiving arm 32b is projected into the path of the cassette B for moving the cassette to the position shown in FIG. 9. When the cassette B is further lowered from the position of FIG. 9, the receiving member 32 starts to rotate counterclockwise because the arm 32b is depressed by the lower surface of the cassette B, and then, when the spring 34 exceeds its over-center point, it jumps into the position at which the spring 34 urges the arm 32c to depress the upper surface of the cassette B, as shown in FIG. 10. The width of the depressing arm 32c is made to be twice the difference in thickness between the thick and thin portions of the cassette. Therefore, when the cassette A is placed on the cassette B as shown in FIGS. 11 and 12, the recording and reproducing tape cassettes A and B are disposed correctly, namely, parallel to one another, because the thick portions of the cassettes A and B are contacted and the thin portions thereof are spaced by the depressing arm 32c.

In FIG. 2, a detection switch 41 is provided at the side of the upper portion 14b of the guide slit 14 and a contact rod of the detection switch 41 is disposed within the upper portion 14b. This arrangement is provided to detect when the pin 2a of the head base plate 2 has reached the upper portion 14b. When such detection is established, the detection switch 41 is placed in the ON state. Similarly, a detection switch 42 is provided to detect when the pin 2a has reached the lower portion 14c of the guide slit 14.

In the operation of the embodiment thus constructed, when the recording and announcement tape cassettes A and B have been suitably stacked as described above, the magnetic heads 16 and 17 and pinch roller 18 mounted on the head base plate 2 are positioned apart from the tape and capstan shaft (because the pin 4b is contacted with the assist cam 5 at its periphery near to the center) so that the pin 4a of the assist lever 4 allows the sliding plate 3 and the head base plate 2 to be moved apart from the front of the stacked cassette by the force of the spring 15. At that time, the pins 2a of the head base plate 2 are positioned at the base positions 13a and 14a of the guide slits 13 and 14, respectively.

In this state of the tape recorder, if a telephone call is received, a pulse having a small width is outputted by the control circuit (not shown) to energize the solenoid 8 for a short time. Upon the energization of the solenoid 8, the control member 29 is attracted to the solenoid 8, thereby rotating the pin 28 of the control lever 9 counterclockwise in FIG. 5 against the spring 25 and allowing the end of the control lever 9 to move out of the rotating path of the pin 21b of the gear wheel 21. Then, the pin 26 of the gear wheel 21 is rotated by the spring 27 clockwise in FIG. 5 to engage the pinion 23, and then the rotation of the gear wheel 21 is continued by the electric motor 6. Upon energization of the solenoid 8, the guide rod 10 is pulled rearwardly so that the bent portion 10a attempts to rotate the folded and inclined portion 7c against the spring 31; however no rotation of the folded portion 7c can be effected because of the short instant of energization of the solenoid 8.

As the gear wheel 21 is rotated, the assist cam 5 is also rotated so that the pin 4b is moved by the periphery of the assist lever 4 counterclockwise in FIG. 5 against the spring 20. Then, the pin 4a of the assist lever 4 pushes the folded portion 3b of the sliding plate 3, thereby moving the head base plate 2 rearwardly. The pins 2a moving rearwardly together with the head base plate 2 are moved forwardly to the lower portions 13c and 14c of the guide slits 13 and 14 because the pins 2a, as well as the head base plate 2, are urged downwardly by the spring 15. Therefore, the magnetic heads 16 and 17 contact the tape of the announcement tape cassette B and the pinch roller 18 pushes the tape against the capstan shaft.

When the gear wheel 21 has rotated by about a half turn and the pin 4b reaches the periphery of the assist cam 5 having a maximum length, the head base plate 2 is in its rearmost position. At that time, the pin 2a in the lower portion 14c of the guide slit 14 contacts the contact rod of the detection switch 42, thereby actuating the detection switch 42. Upon actuation of the detection switch 42, the reel base and the capstan shaft are driven and an electronic circuit, including an amplifier, etc., is actuated so that the message previously recorded on the tape in the announcement tape cassette B is played and transmitted to the calling party.

In the state where the pin 4b reaches the maximum periphery of the assist cam 5, the recess portion 21a of the gear wheel 21 is located opposite to the pinion 23 and rotation of the gear wheel 21 is inhibited because the pin 21c of the gear wheel 21 is made to contact the end of the control lever 9 due to the force of the spring 25. Therefore, the reproducing operation for the cassette B is maintained. At this time, the spring 27 tries to rotate the pin 26 clockwise in FIG. 5; however, rotation of the pin 26 as well as of the gear wheel 21 is inhibited by the control lever 9.

When the reproducing operation for the cassette B is completed, a pulse having an intermediate width is outputted by the control circuit and applied to the solenoid 8. Upon energization of the solenoid 8, the control lever 9 is rotated, thereby allowing rotation of the gear wheel 21, similar to the case described above. The pulse width for energizing the solenoid 8 is set so that the end of the control lever 9 is located outside the rotating path, at least for the time that the pin 21d and 21c pass through the position of the end of the control lever 9, so that the gear wheel 21 is again engaged with the pinion 23 by the action of the spring 27. Then, when the gear wheel 21 has rotated by about half a turn, the pinion 23 is located opposite the recess portion 21a, thereby stopping the rotation of the gear wheel 21 and returning to the initial state as shown in FIG. 5. Furthermore, also the assist cam 5, the assist lever 4, and the head base plate 2 return to their initial positions, as shown in FIGS. 5 and 6. At the start of this return operation, the detection switch 42 is turned to the OFF state, thereby stopping the announcing operation.

Then, a pulse having a comparatively wide width, outputted by the control circuit, is applied to the solenoid 8. Upon energization of the solenoid 8, the guide rod 10 is pulled rearwardly and the bent portion 10a of the guide rod 10 pushes the folded and inclined portion 7c, thereby rotating the guide plate 7 counterclockwise in FIG. 6 against the spring 31. By the rotation of the guide plate 7, the end 7a of the guide plate 7 pushes up head base plate 2 against the resilient force of the spring 15. On the other hand, by the energization of the solenoid 8, the control lever 9 is freed from the pin 21b of the gear wheel 21, and the assist cam 5, as well as the gear wheel 21, is rotated, thereby again moving the head base plate 2 rearwardly as discussed above. Since the solenoid 8 is energized for a comparatively long time and the head base plate 2 is pushed upwardly by the end 7a of the guide plate 7 during that time, the pins 2a of the head base plate 2 reach the upper portions 13a and 14a of the guide slits 13 and 14, respectively. As a result, the magnetic heads 16 and 17 contact the tape of the recording tape cassette A and the pinch roller 18 pushes the tape against the capstan shaft. Further, the detection switch 41 is actuated to actuate the reel base, the capstan shaft, and the electronic circuit, and therefore messages from the calling party can be recorded on the tape of the recording tape cassette A.

As mentioned above with respect to the announcing operation, when the gear wheel 21 is rotated by about half a turn, the gear wheel 21 stops because the recess portion 21a is located opposite the pinion 23 and the solenoid 8 is already deenergized. Therefore, the end of the control lever 9 stops the rotation of the pin 21c of the gear wheel 21. As a result, the recording operation is maintained.

As is apparent from the above explanation, it is necessary for changing the mode from announcing to recording to maintain the energization of the solenoid 8, at least for the time required for moving the pins 2a of the head base plate 2 from the base portions 13a and 14a to the upper portions 13b and 14b of the guide slots 13 and 14, respectively.

When the recording operation is completed, a pulse having the intermediate width outputted from the control circuit is applied to the solenoid 8, whereupon the gear wheel 21 and the assist cam 5 are rotated by about a half turn to return the head base plate 2 and the detection switch 41 to their initial positions.

Cue and review modes are effected by an operation whereby, in the state where the pin 21c of the gear wheel 21 contacts the end of the control lever 9, the solenoid 8 is instantaneously energized. Namely, if the solenoid 8 is instantaneously energized in the above state, the end of the control lever 9 makes free only the pin 21c and stops the pin 21d. Thus, such instant motion of the control lever 9 allows a slight rotation of the gear wheel 2, which slight rotation is made within the range of the recess portion 21a. Hence, the gear wheel 21 cannot be engaged with the pinion 23. By the slight rotation of the gear wheel 21, the assist cam 5 is also slightly rotated and the assist lever 4 is slightly rotated by the spring 20 clockwise in FIG. 5. Therefore, the head base plate and the sliding plate 3 are slightly moved toward the front side, which results in light contact between the magnetic head and the tape. In this state, the reel base is rotated at a high speed to feed the tape so that messages recorded on the tape can be searched quickly. The cue and review modes may be stopped by energizing the solenoid with a pulse having the intermediate width so that the mechanism returns to its initial position.

In the state of the guide plate 7 shown in FIG. 7, namely, in the state in which the cassette B depresses the end 7a of the guide plate 7 and thereby rotating the guide plate 7 clockwise in FIG. 7, the bent portion 10a of the guide rod 10 is positioned under the folded and inclined portion 7c. Thus, even if the solenoid 8 is energized for the stop, cue or review mode to pull the guide rod 10 rearwardly, the bent portion 10a does not affect the portion 7c of the guide plate 7.

According to the present invention, a head base plate on which the magnetic heads and pinch roller are mounted is selectively moved with respect to the stacked and stationary recording and announcement tape cassettes without moving the stacked tape cassettes with respect to stationary magnetic heads and pinch roller. Accordingly, the space required for moving members for changing between recording and reproducing modes is reduced, and a complex positioning mechanism, which is necessary for a conventional double-cassette tape recorder, can be omitted, which results in a compact double-cassette tape recorder.

While the present invention has been particularly described with reference to specific embodiments thereof, it is to be understood that the words which have been used are words of description rather than limitation and that changes may be made within the purview of the appended claims without departing from the true scope and spirit of the present invention in its broader aspects.

What is claimed is:

1. A double-cassette tape recorder, comprising:
   (a) an elongate base plate (2) having guide pins (2a) extending outwardly from opposite ends thereof,
   (b) a pair of spaced magnetic heads (16, 17) and a pinch roller (18) mounted on said base plate,
   (c) means (3, 4, 5) for controllably displacing said base plate frontwardly and rearwardly relative to a magnetic tape accessing position,
   (d) an upper recording tape cassette (A) and a lower reproducing tape cassette (B) diposed in a stacked manner one atop the other,
   (e) means (11) for retaining said upper and lower cassettes in said stacked manner, comprising at least one arm (32c) for engaging and depressing an upper surface of said lower cassette and for maintaining a predetermined space between reduced thickness rear portions of said stacked lower and upper cassettes,
   (f) a pair of guide means (12) flanking opposite ends of said base plate, each guide means having chevron-shaped slots (13, 14) receiving said guide pins for guiding movements of said base plate between said upper and lower cassettes, and
   (g) electromagnetic drive means (6) for driving said displacing means.

2. The tape recorder according to claim 1, wherein said retaining means arm has a width equal to a difference in height between a thick front portion and a thin rear portion of one of said cassettes.

3. The tape recorder according to claim 1, wherein said retaining means further comprises an arm (32f) for receiving the lower cassette.

4. The tape recorder according to claim 3, further comprising an over-center spring (34) for driving said arm of said retaining means.

5. The tape recorder according to claim 1, wherein said displacing means comprises a gear wheel (21), a cam (5) mounted on the wheel, a pivot lever (4) having one end engaging the cam, and a slide plate (3) coupled to the base plate and engaged by another, opposite end of the pivot lever.

6. The tape recorder according to claim 1, wherein said electromagnetic driving means comprises a motor.

7. The tape recorder according to claim 1, wherein said guide means slots are wishbone-shaped.

8. The tape recorder according to claim 1, further comprising a spring (15) for biasing said base plate into a lower position thereof, a guide plate (7) having an end portion (7a) for pushing up said base plate into an upper position thereof, and a solenoid (8) for driving said guide plate.

* * * * *